Aug. 25, 1942.  B. L. FAIRFAX  2,294,082
FISH LURE
Filed July 15, 1941
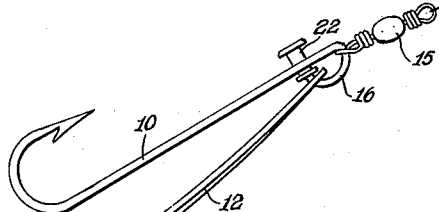
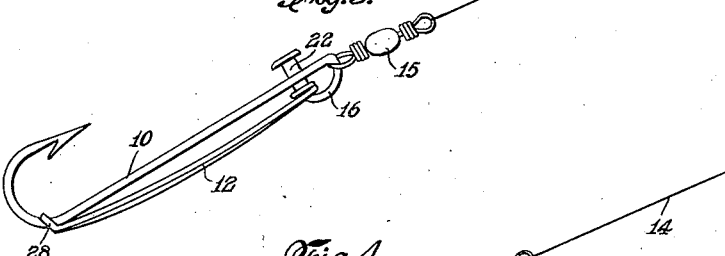
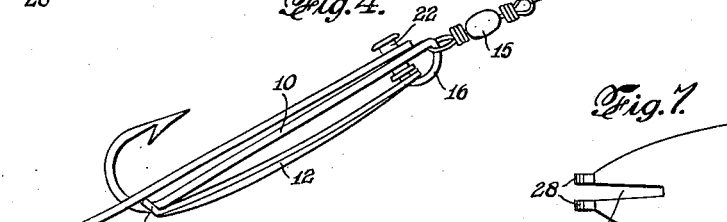
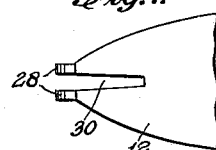
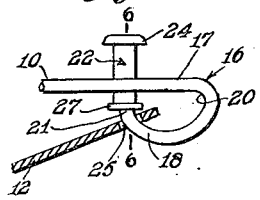
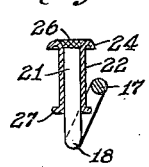
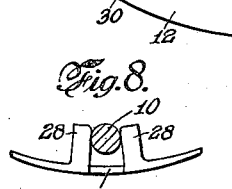
INVENTOR.
B. L. Fairfax
BY Williams, Rich & Morse
ATTORNEYS.

Patented Aug. 25, 1942

2,294,082

UNITED STATES PATENT OFFICE 2,294,082

FISH LURE

Bradford Lindsay Fairfax, Fishkill, N. Y.

Application July 15, 1941, Serial No. 402,448

5 Claims. (Cl. 43—45)

This invention relates to fish lures and has particular reference to that spinner type of lure wherein a blade and a hook are hingedly connected together at their forward ends and are adapted to rotate in unison as the lure is drawn through the water.

In the above mentioned type of lure, the relationship of the blade and hook is such that during rotation the hook, acting under the influence of centrifugal force, is separated at its hooked end from the blade to such an extent that a fish, when striking the blade, misses the hook and is thus lost to the fisherman.

Also, in the above mentioned type of lure, the connection afforded between the blade and hook is such that the hook, especially when the blade and hook are rotating, is so often caused to assume not only the above mentioned relation to the blade but also a position other than that which would enable it to function to advantage in hooking a fish incident to the strike.

Important objects of the present invention are to overcome the foregoing objections, and to these and other ends the invention contemplates a fish lure of the spinner type which is so constructed that the hook, which is hingedly connected at its front end to the front end of the blade, is subjected to such induced forces, incident to rotation of the lure, that it is held in close relation to the blade, the construction of the lure being also such that the hook is maintained at all times in a right angle relationship to the blade.

Another object of the present invention is to provide improved means whereby the blade and hook may be quickly anchored to each other in a fixed relation, thus enabling one at will to transform the lure from a spinner type bait into a wobbler type bait, the anchoring means being such, of course, that it may also be quickly released, at will, when it is desired to re-convert the lure into a spinner type bait and also such that a fish upon delivering a strike will effect its release so as to obviate any leverage that the blade might otherwise afford the fish in its effort to free itself from the hook; and to these and other ends the invention contemplates a blade which is formed with a slot at its rear margin and there provided with a pair of upstanding lugs adapted to receive and so cooperate with the shank portion of the hook as to retain it in a close proximity to the blade until released either by design or incident to the impact of a striking fish.

A further object of the invention is to provide improved means whereby a pork-rind strip, or the equivalent of such, may be readily attached to and detached from the lure; and to this end the shank of the hook is so formed at its front end as to there provide a pin-like arbor disposed at right angles to the hook shank and adapted to receive a button-like element, such, for example, as a tubular rivet the shank portion of which is suitably secured to the arbor in surrounding relation thereto and the head portion of which is spaced a suitable distance from the hook shank to allow the pork-rind strip, or its equivalent, to be buttoned in such positions as will permit it to assume a contiguous relation to the shank of the hook after threading the hook through the strip at some point intermediate its ends.

Other objects and advantages of the invention will become apparent from the following description when taken in connection with the accompanying drawing in which Fig. 1 is a view showing in elevation a fish lure embodying the invention and conditioned for operation as a spinner;

Fig. 2 is a view similar to that of Fig. 1 and showing the lure in association with a flexible element, such as a pork-rind strip, detachably held in a contiguous relation to the shank of the hook;

Fig. 3 is a view similar to that of Fig. 1 and showing the lure conditioned to function as a wobbler type bait;

Fig. 4 is a view similar to Fig. 3 and showing the lure in association with a flexible element, such as that appearing in Fig. 2;

Fig. 5 is an enlarged fragmental view, showing the manner in which the front end of the hook-shank is bent to provide a hinge-like connection between the hook and the blade of Figs. 1 to 4 and also showing the relationship of the button-like element to the shank of the hook;

Fig. 6 is a sectional view taken on line 6—6 of Fig. 5 and showing in further detail the relationship of the button-like element to the hook shank;

Fig. 7 is a fragmental face view showing the hook anchoring means in the form of a pair of upstanding lugs carried by the blade at its rear margin and disposed in an adjacent relation to the slot provided in such blade; and Fig. 8 is an enlarged view showing in elevation the hook retaining lugs and their relationship to the shank of the hook when such hook is anchored in its position shown in Figs. 3 and 4.

Referring to the drawing, it will be observed that the lure embodying the present invention comprises essentially a hook 10 and a blade 12 hingedly connected together at their forward ends, the hook-and-blade unit being adapted to be attached to a fishing line 14 through the medium of a suitable connector, herein shown as a so-called barrel swivel 15.

As shown in Figs. 1 to 4, and as is most clearly illustrated in Figs. 5 and 6, the means by which the blade 12 is hingedly connected to the hook 10, is conveniently provided by bending the shank of the hook rearwardly and then upwardly to form an elongated connector link 16, the leg portion 17 and base portion 18 of which form a sharply defined corner 20 at the front of the link and the base portion 18 of which presents a pin-like arbor 21 which extends past the shank of the hook at right angles thereto and is adapted to receive a button-like element, such as a tubular rivet 22, the cylindrical or body portion of which is suitably secured to the arbor in surrounding relation thereto and the retaining head portion 24 of which is spaced a suitable distance from the hook shank for the purpose which will hereinafter more clearly appear.

With regard to the link 16, it is to be observed that the pin-like arbor 21, prior to receiving the rivet 22, is spaced a sufficient distance from the shank of the hook 10 to enable the blade 12 and swivel 15 to be conveniently assembled on the link by passing the arbor through the link-receiving eye of the swivel and thereafter passing such arbor through the link-receiving aperture 25 of the blade, the diameter of the aperture 25 being only slightly greater than the diameter of the arbor but yet permitting the blade to be freely moved from one to another angular position with relation to the shank of the hook under certain conditions of operation hereinafter mre particularly described. It will be understood, of course, that after the blade 12 and swivel 15 are assembled on the link 16, the rivet 22 is applied to the arbor 21 and secured in proper position thereon by introducing a quantity of solder into the rivet head and allowing it to adhere to the rivet and to the end of the arbor as shown at 26 in Fig. 6. In order that a substantial contact area may be afforded between the rivet 22 and the blade 12, when the lure is conditioned for use as a wobbler bait, the rivet is provided with a contact head 27, the diameter of which is substantially greater than that of the blade aperture 25.

Referring particularly to the formation of the link 16, it will be observed that its corner 20, which is adapted to accommodate the link-receiving eye of the swivel 15, is so located with reference to the point at which the blade 12 is connected to the link that, when a pull is exerted on the line 14 and a resistance to translation is offered the free blade 12 as the lure is drawn through the water, the shank of the hook 10 tends to assume a position of substantial alignment with the direction of pull on the line. However, since the free blade 12 undergoes a spinning action under such conditions of operation, the hook, which is in effect pivotally connected to the swivel 15, is subjected at its point of pivotal connection with the blade 12 to a force which is applied radially of the hook shank and is accounted for by the centrifugal action of the rotating blade. The radial force thus transmitted to the hook 10 causes such hook, which is free to undergo a pivotal movement about its point of connection with the swivel 15, to assume such a position, as illustrated in Figs. 1 and 2, that its shank assumes a position intermediate the rotating blade 12 and the line of pull exerted on the lure through the line 14. Thus it will be understood that through the medium of the present invention, centrifugal action of the blade 12, when the lure is employed as a spinner bait, is utilized to maintain such blade and its associated hook 10 relative close relationship so as to obviate the possibility of a fish missing the hook when striking the blade.

The structure thus far described admirably lends itself to the inclusion of simple means whereby the lure may be quickly transformed at will from a spinner bait into a wobbler bait and vice versa. The means herein employed for making possible such transformations comprises a pair of upstanding lugs 28 formed integral with the blade 12 at the rear margin thereof and adjacent the open end of a slot 30 provided in such blade. The lugs 28 are spaced in such relation to each other that they are adapted to receive the shank of the hook therebetween and thus retain the hook in close proximity to the blade until released either by design or incident to the impact of a striking fish, the automatic release of the hook by a striking fish, being of advantage in that it obviates any leverage that the blade might otherwise afford the fish in its effort to free itself from the hook.

Referring again to the slot 30, attention is called to the fact that its presence facilitates the making of such slight spacing adjustments of the lugs 28 as will enable them to effectively retain the hook and blade in a fixed relation during the cast and during such time as the lure is being retrieved as a wobbler bait, it being remembered, however, that the lug spacing is also such as will permit ready release of the hook and blade incident to the strike as well as when such release is desired in order to transform the lure from a wobbler type of bait into one of the spinner type.

It is to be observed, particular reference being had to Figs. 5 and 6, that the contact head 27 of the rivet 22 is coincident with a plane perpendicular to the arbor 21 and affords a substantial contact area, which, when the hook is anchored to the blade 12 as in Figs. 3 and 4, is disposed in a close and contiguous relation to the face of the blade at its front or hingedly connected end. Thus, it will be understood that the contact area just mentioned may be relied on to function as a seat or an abutment, with which the face of the blade 12 adjacent the aperture 25 engages and cooperates to lend substantial rigidity to the hook-and-blade unit when the lure is conditioned for use as a wobbler bait.

Regardless of whether the lure is employed as a spinner bait or as a wobbler bait, such lure is admirably adapted for use with a flexible element, such as a pork-rind strip 31 or its equivalent. The pork-rind strip 31 is herein illustrated as of conventional design in that it is provided at its front end and at a point intermediate its ends with slits or apertures, not shown, the slit or aperture at the front end being adapted to receive the button-like element or rivet 22 and the intermediate slit or aperture being adapted to receive the curved end of the hook 10 so as to enable the strip to assume a contiguous relation to the shank of the hook while its front end is effectively retained intermediate the hook shank and the rivet head.

With further regard to the link 16 and its relation to the blade 12, emphasis is here made of the fact that the link and blade are so cooperatively related to each other that the hook 10 is at all times held in a plane which is perpendicular, or substantially perpendicular, to the blade as the lure is drawn through the water. Such angular relationship of the hook 10 and the blade 12 obviously enables the hook to function to a pronounced advantage in hooking a fish incident to the strike, as will be readily understood by pointing out that were the hook disposed, for example, in a plane approaching parallelism to the blade at the instant of the strike the hook would doubtless pass between the jaws of the striking fish without its point making a piercing contact with either jaw. Maintenance of the perpendicular, or substantially perpendicular, relationship of the hook 10 and blade 12 is accounted for in the present lure by the fact that the diameter of the blade aperture 25 so nearly approaches the diameter of the base portion 18 of the link 16 that the hook, on which the link is carried in a fixed relation to the hook shank, cannot tilt more than a negligible extent with reference to the blade when the lure is being used either as a spinner bait or as a wobbler bait.

Although only one form of lure embodying the present invention is herein shown and described, it will be understood that various changes may be made without departing from the spirit of the invention or the scope of the following claims.

I claim:

1. A fish lure comprising a blade, a hook having a shank, means hingedly joining said blade and hook together at their front ends for rotation in unison and including a link carried by said shank in rigid relation thereto and comprising a leg portion and a base portion, said base portion being in part disposed in a transverse relation to said shank at the rear of the front end of said hook and there supporting said blade in hinged relation to said hook.

2. A fish lure comprising a blade, a hook having a shank, means hingedly joining said blade and hook together at their front ends for rotation in unison and including a link carried by said shank in rigid relation thereto and comprising a leg portion and a base portion, said base portion being in part disposed in a transverse relation to said shank at the rear of the front end of said hook and there supporting said blade in hinged relation to said hook and there presenting a pin-like arbor, and a button-like element carried by said arbor and adapted to receive thereon a flexible element in anchored relation to the lure as a whole.

3. A fish lure comprising a blade, a hook having a shank adapted to be connected at its front end to a fishing line, and a connection afforded between said blade and said hook at their front ends and including a connector element carried by said shank in rigid relation thereto and supporting said blade for hinge-like movement with relation to said hook and for rotation in unison with said hook as the lure is moved through the water, and anchoring means operable at will for retaining said blade and hook in a fixed contiguous relation so as to thereby transform the lure from a spinning bait into a wobbler bait, said anchoring means including a pair of lugs carried at the rear of said blade in a spaced relation to each other and adapted to receive therebetween the shank of said hook and retain such shank in a fixed position until forceably released, said blade being provided with a slot adjacent said lugs and adapted to facilitate the making of lug-spacing-adjustments.

4. A fish lure comprising a blade, a hook having a shank, means hingedly joining said blade and hook together at their front ends for rotation in unison and including a link carried by said shank in rigid relation thereto and comprising a base portion and a pair of leg portions, said base portion being in part disposed in a transverse relation to said shank at the rear of the front end of said hook and there supporting said blade in swinging relation to said hook and there presenting a pin-like arbor, a button-like element carried by said arbor and adapted to receive thereon a flexible element in anchored relation to the lure as a whole, and anchoring means operable at will for retaining said blade and hook in a fixed contiguous relation so as to thereby transform the lure from a spinning bait into a wobbler bait, said anchoring means including a pair of lugs carried at the rear of said blade in a spaced relation to each other and adapted to receive therebetween the shank of said hook and retain such shank in a fixed position until forceably released.

5. A fish lure comprising a blade, a hook having a shank, and a connection afforded between said blade and said hook at their front ends and including a connector element carried by said hook at its front end and supporting said blade for hinge-like movement with relation to said hook and for rotation in unison with said hook as the lure is moved through the water, and anchoring means operable at will for retaining said blade and hook in a fixed contiguous relation so as to thereby transform the lure from a spinning bait into a wobbler bait, said anchoring means including a pair of lugs carried at the rear of said blade in a spaced relation to each other and adapted to receive therebetween the shank of said hook and retain such shank in a fixed position until forceably released, said blade being provided with a slot adjacent said lugs and adapted to facilitate the making of lug-spacing-adjustments.

BRADFORD LINDSAY FAIRFAX.